(No Model.)
R. LUNDELL.
ELECTRO MAGNETIC MACHINE.
No. 469,862. Patented Mar. 1, 1892.
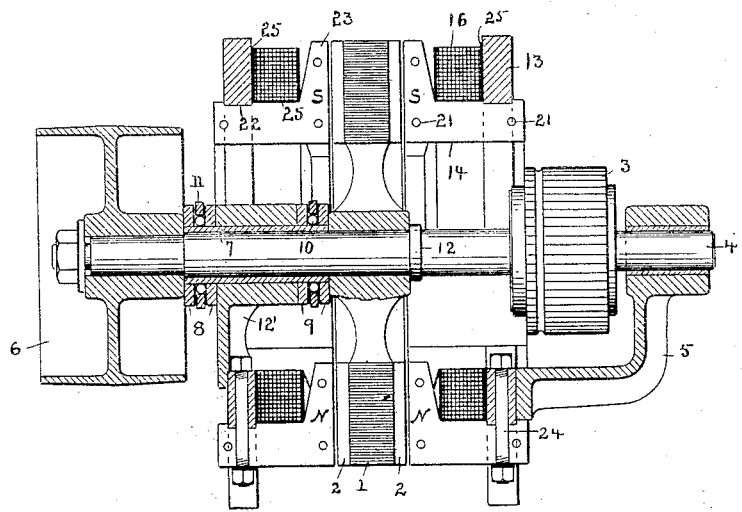
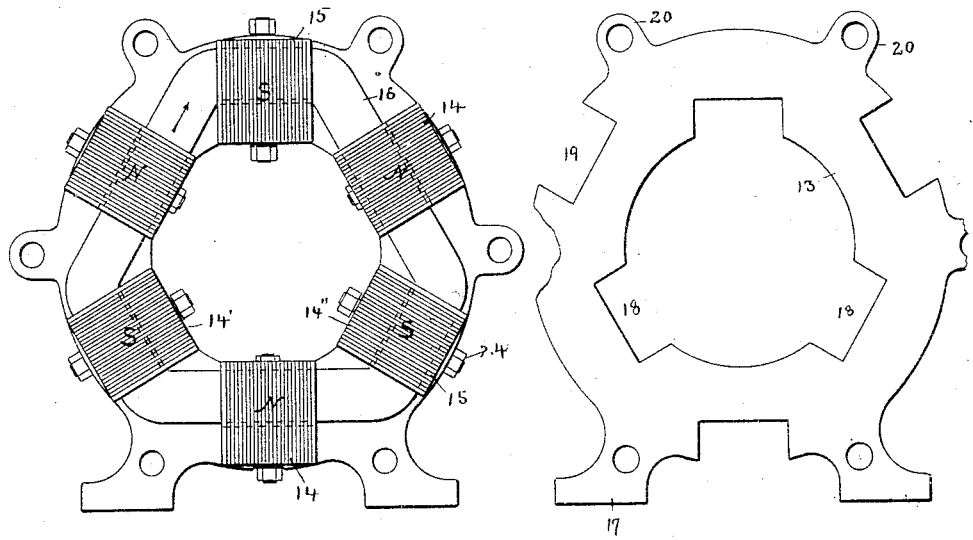
WITNESSES:
INVENTOR
R. Lundell
BY
Dyer & Seely
ATTORNEYS

UNITED STATES PATENT OFFICE.

ROBERT LUNDELL, OF NEW YORK, N. Y., ASSIGNOR OF ONE-HALF TO EDWARD H. JOHNSON, OF SAME PLACE.

ELECTRO-MAGNETIC MACHINE.

SPECIFICATION forming part of Letters Patent No. 469,862, dated March 1, 1892.

Application filed August 5, 1891. Serial No. 401,775. (No model.)

*To all whom it may concern:*

Be it known that I, ROBERT LUNDELL, a citizen of the United States, residing at New York city, county and State of New York, have invented a certain new and useful Improvement in Electro-Magnetic Machines, of which the following is a specification.

The present invention relates to the construction and arrangement of several parts of dynamos or electric motors, and especially to the construction of the field-magnets and the arrangement of the magnetizing-coils for said field-magnets.

In the accompanying drawings, Figure 1 is a central section of the improved machine. Fig. 2 is a side view of one section of the field-magnet, looking at the faces of the pole-pieces; and Fig. 3 is a side view of one of the yokes of the field-magnet.

In the machine illustrated the armature 1 is an ordinary disk armature, preferably having radial grooves 2 at regular intervals, in which grooves the armature-coils are wound. For the sake of simplicity in illustration the coils are omitted. The commutator 3 is also of any suitable construction. The commutator is preferably mounted on the armature-shaft 4 inside of the bracket 5, so that the wires leading from the armature-coils to the commutator-segments may pass directly to the commutator without the necessity of leading them through a hollow shaft or bushing, as is usual. At the opposite end of the armature-shaft is an ordinary pulley 6. At a suitable point on the shaft is placed a hard-metal sleeve 7, on which are rings 8 9, holding between them series of steel balls 10, which are confined by an encircling ring 11. On the armature-shaft is also a collar 12, resting directly against one face of the hub from which the armature is supported. It will be seen that this arrangement provides a ball or anti-friction bearing for receiving the thrust whenever the armature-shaft tends to move toward the right or toward the left, as sometimes occurs—when, for example, the magnetic pull of the field-magnet on the armature on one side is stronger than on the other.

12′ is a spider resting on the yoke of the field-magnet and forming a bearing for the armature-shaft. Each section of the double field-magnet of the machine comprises a frame or yoke 13 and several detachable pole-pieces 14 15 at or near its edges or sides and a magnetizing-coil 16. The general outline of the yoke is shown in Fig. 3, it being of ring shape with supporting-feet 17 and having a series of recesses 18 at regular intervals on its inner edge and a series of recesses 19, alternating with recesses 18, on its outer edge. While 18 and 19 are referred to as "recesses," it is evidently not essential that the fourth side of the recess should be open, as illustrated. In other words, instead of being notches in the yoke, they may be holes through the yoke, into which the pole-pieces can be set. The yoke is also provided with perforated lugs 20 for the reception of bolts for joining the two yokes of a machine in an ordinary manner. In Fig. 3 the yoke is shown with three inner and three outer recesses; but this number is not essential. The pole-pieces are laminated, being made up of several plates of sheet-iron of substantially the shape shown at 14, Fig. 1, the plates being piled together and secured by rivets 21. These pole-pieces may be described as L-shaped, and it will be found that the nearer to this shape they are made the better they will serve the purpose. Still it is possible to vary their shape to some extent, as by rounding or curving one or more of the sides, without destroying their general shape, and when I use the term "L-shaped" I intend to include these slight variations in form. The pole-pieces are preferably provided with grooves 22 of width equal to the thickness of the yoke. The pole-pieces, constructed as described, are placed in the recesses 18 19, the grooves 22 fitting over the yoke. The pole-pieces are so placed in the recesses 18 that the foot 23 of each pole-piece points from the center of the yoke, while the pole-pieces in the recesses 19 are so placed that the feet 23 point toward the center. This is most clearly indicated in Fig. 1, in which the upper pole-pieces are mounted in inner recesses, while the lower pole-pieces are mounted in outer recesses. The pole-pieces are secured to the yokes by suitable bolts 24. The single field-magnet coil for each section is made by taking a former of suitable shape and made of some rigid insulating material—such as prepared asbestos—and winding the coil in the former. In Fig. 1 the former is indicated by the heavy black lines 25, surrounding the coil 16 on three sides. In building up the machine I first secure the lower pole-piece 14 in place and rest the former with its inclosed coil 16 on this pole-piece in the position indicated in Fig. 2. I then secure in place the two pole-pieces 14′ 14″. This securely binds the coil in position, and the other pole-pieces may be inserted at will. No fastening devices for the coil are needed in addition to the pole-pieces.

By arranging the several parts as already described I provide a multipolar machine adapted for use with a disk armature and having several extended pole-pieces the faces of which will lie close to and parallel with the sides, as distinguished from the inner and outer peripheries of the armature, and the pole-pieces on each side of the armature are all energized by a single coil, the coil passing between the north and south poles, but not being wrapped around them. This arrangement is just as efficient as though the coils were wrapped around the pole-pieces and provides an exceedingly simple and cheap construction. The disk armature will be very strongly magnetized by the two complete magnets on its opposite sides.

When the pole-pieces are formed as described, the ends or faces thereof will be rectangular, as shown in Fig. 2, and the edges of the poles will not be radial, but will be in lines parallel with a diameter passing through their centers. Since the coils on the armature are arranged in radial grooves, as the armature rotates in the field the armature-coils will pass in front of and away from the poles gradually—that is, the armature-coils will first pass over one of the lower corners of each pole-piece and then will gradually pass on, so that it stands directly over the pole-piece, and will then pass over one of the upper corners of the pole-piece, and finally will leave the pole-piece entirely. This causes a gradual rise and fall in the magnetic changes in the machine and obviates or largely reduces sparking at the commutator-brushes.

As already indicated, the number and shape of the poles of the field-magnet may be varied without departing from my invention. The construction of the field-magnet coils may also be varied, the only essential being that the coils should pass between and not around the pole-pieces, as described. The same construction of field-magnet is applicable to alternating-current machines.

What I claim is—

1. The combination of a disk armature and a double field-magnet having a set of positive and negative poles on each side of the disk armature, each set of pole-pieces being magnetized by a single magnetizing-coil, substantially as described.

2. The combination of a disk armature and a double field-magnet having a set of positive and negative poles on each side of the disk armature, each set of pole-pieces being magnetized by a single magnetizing-coil, poles of like name being opposite each other, whereby the armature is magnetized from both sides by pole-pieces of the same polarity, substantially as described.

3. The combination of a disk armature and a multipolar field-magnet with positive and negative poles on each side of the disk armature, each field-magnet having a single separate magnetizing-coil at right angles to the axis of rotation, substantially as described.

4. A field-magnet for electro-magnetic machines, comprising a suitable yoke, laminated L-shaped pole-pieces projecting from the face of the yoke alternately from the inner and the outer edge, and a magnetizing-coil outside of one set of pole-pieces and inside of the other set, substantially as described.

5. A yoke for the field-magnet of electromagnetic machines, consisting of a ring-shaped frame or plate having recesses arranged at intervals around it alternately on the inner and outer edges, substantially as described.

6. A yoke for the field-magnet of electromagnetic machines, consisting of a ring-shaped frame or plate having recesses arranged at intervals around it alternately on the inner and outer edges, in combination with pole-pieces in said recesses and secured to said frame or plate, substantially as described.

7. A yoke for the field-magnet of electromagnetic machines, consisting of a ring-shaped frame or plate having recesses arranged at intervals around it alternately on the inner and outer edges, in combination with L-shaped pole-pieces placed in said recesses and secured to said frame or plate, the pole-pieces in the inner and outer recesses, respectively, being extended in opposite directions, substantially as described.

8. The combination, in an electro-magnetic machine, of a disk armature and a field-magnet consisting of a yoke with pole-pieces mounted alternately at or near its inner and outer edges, the pole-pieces at one edge being positive and those at the other edge being negative and all of the pole-pieces having faces in the same plane and substantially parallel with the sides of the disk armature, as set forth.

9. The combination, in an electro-magnetic machine, of a disk armature and two field-magnets, one on one side and one on the opposite side of the armature, each magnet having alternate positive and negative poles having faces in the same plane and substantially parallel with the sides of the armature, substantially as set forth.

This specification signed and witnessed this 29th day of July, 1891.

ROBERT LUNDELL.

Witnesses:
CHARLES M. CATLIN,
J. A. YOUNG.